US009852751B2

United States Patent
Kurihara et al.

(10) Patent No.: US 9,852,751 B2
(45) Date of Patent: Dec. 26, 2017

(54) THIN FILM MAGNETIC HEAD, HEAD GIMBALS ASSEMBLY, HEAD ARM ASSEMBLY, AND MAGNETIC DISK UNIT WITH IMPROVED AIR BEARING SURFACE

(71) Applicant: TDK CORPORATION, Tokyo (JP)

(72) Inventors: Katsuki Kurihara, Tokyo (JP); Atsushi Yamaguchi, Tokyo (JP); Yosuke Antoku, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/069,104

(22) Filed: Mar. 14, 2016

(65) Prior Publication Data
US 2017/0263274 A1 Sep. 14, 2017

(51) Int. Cl.
*G11B 5/31* (2006.01)
*G11B 5/39* (2006.01)
*G11B 5/48* (2006.01)
*G11B 5/60* (2006.01)

(52) U.S. Cl.
CPC ............ *G11B 5/3929* (2013.01); *G11B 5/314* (2013.01); *G11B 5/3912* (2013.01); *G11B 5/4826* (2013.01); *G11B 5/4833* (2013.01); *G11B 5/607* (2013.01)

(58) Field of Classification Search
CPC ................................. G11B 5/314; G11B 5/607
USPC ............................ 360/125.31, 125.74, 294.7
See application file for complete search history.

(56) References Cited

U.S. PATENT DOCUMENTS

| | | | |
|---|---|---|---|
| 5,991,113 A | 11/1999 | Meyer et al. | |
| 7,068,468 B2 | 6/2006 | Kamijima | |
| 7,403,354 B2 | 7/2008 | Pust et al. | |
| 7,573,682 B2 * | 8/2009 | Pust ...................... | G11B 5/3116 360/125.31 |
| 7,808,746 B2 * | 10/2010 | Burbank .............. | G11B 5/6005 360/294.3 |
| 8,159,782 B2 * | 4/2012 | Kobayashi ........... | G11B 5/1278 360/125.31 |
| 2003/0174430 A1 | 9/2003 | Takahashi et al. | |
| 2006/0193081 A1 * | 8/2006 | Pust ...................... | G11B 5/3136 360/128 |
| 2007/0127161 A1 * | 6/2007 | Sano ..................... | B82Y 10/00 360/313 |
| 2007/0188919 A1 | 8/2007 | Kobayashi | |
| 2007/0236836 A1 | 10/2007 | Kurita et al. | |
| 2007/0268624 A1 * | 11/2007 | Luo ........................ | G11B 5/314 360/125.31 |
| 2011/0013316 A1 * | 1/2011 | Brand .................. | G11B 5/3133 360/110 |

(Continued)

FOREIGN PATENT DOCUMENTS

JP 2003168274 A 6/2003
JP 2003272335 A 9/2003
(Continued)

*Primary Examiner* — Jefferson Evans
(74) *Attorney, Agent, or Firm* — Oliff PLC

(57) ABSTRACT

This thin film magnetic head includes: a magnetic pole including an end surface exposed on an air bearing surface; and a heating element including a first branch and a second branch and configured to heat a vicinity of the magnetic pole. The first branch and the second branch each expand along a stacking surface and are coupled in parallel to each other. The stacking surface intersects the air bearing surface.

15 Claims, 7 Drawing Sheets

(56) References Cited

U.S. PATENT DOCUMENTS

| | | | | |
|---|---|---|---|---|
| 2012/0092789 A1* | 4/2012 | Hsiao | ............... | G11B 5/607 |
| | | | | 360/59 |
| 2012/0099218 A1* | 4/2012 | Kurita | ............... | G11B 5/6076 |
| | | | | 360/59 |
| 2012/0127602 A1* | 5/2012 | Li | ............... | G11B 5/607 |
| | | | | 360/75 |
| 2015/0262596 A1* | 9/2015 | Zuckerman | ............... | G11B 5/4866 |
| | | | | 369/13.13 |

FOREIGN PATENT DOCUMENTS

| | | | |
|---|---|---|---|
| JP | 2006244692 A | 9/2006 |
| JP | 2007220180 A | 8/2007 |
| JP | 2007280502 A | 10/2007 |
| JP | 2008165950 A | 7/2008 |

\* cited by examiner

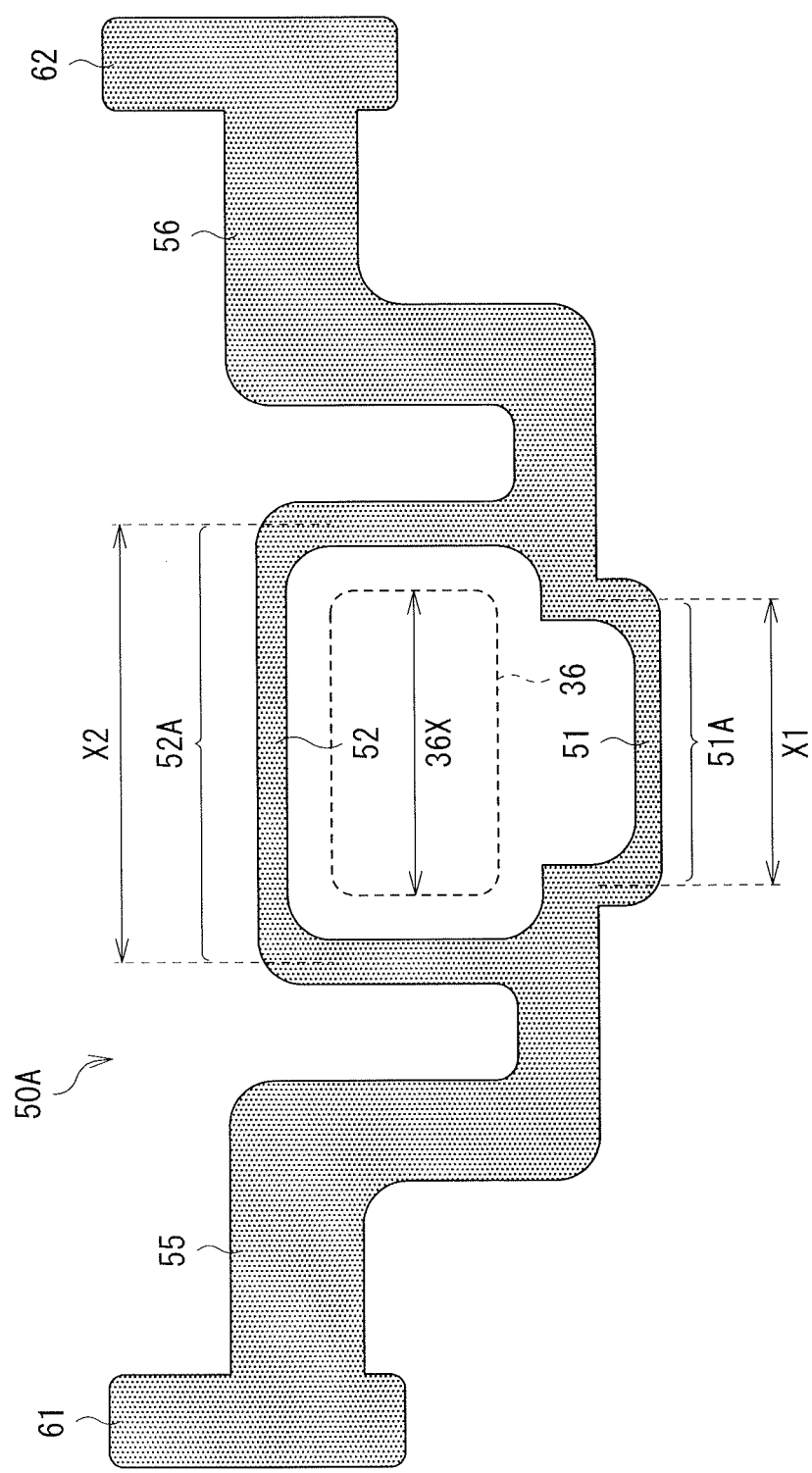

THIN FILM MAGNETIC HEAD, HEAD GIMBALS ASSEMBLY, HEAD ARM ASSEMBLY, AND MAGNETIC DISK UNIT WITH IMPROVED AIR BEARING SURFACE

BACKGROUND

The invention relates to a thin film magnetic head, a head gimbals assembly, a head arm assembly, and a magnetic disk unit each including a magnetic read head section and a magnetic write head section.

A magnetic disk unit has been used for writing and reading magnetic information (hereinafter, simply referred to as information). The magnetic disk unit may include, for example, in a housing thereof, a magnetic disk in which information is stored, and a thin film magnetic head that writes information into the magnetic disk and reads information stored in the magnetic disk. The magnetic disk is supported by a rotary shaft of a spindle motor, which is fixed to the housing, and rotates around the rotary shaft. In contrast, the thin film magnetic head is formed on a side surface of a magnetic head slider that is provided on one end of a suspension, and includes a magnetic write element and a magnetic read element that have an air bearing surface (ABS) facing the magnetic disk. In particular, as the magnetic read element, a magnetoresistive (MR) element exhibiting MR effect is generally used. The other end of the suspension is attached to a tip end of an arm that is supported and allowed to pivot by a fixed shaft that is installed upright inside the housing.

When the magnetic disk unit is in a stationary state, namely, when the magnetic disk does not rotate and remains stationary, the ABS of the thin film magnetic head is in contact with a surface of the magnetic disk while being lightly pressed against the surface by energization force of the suspension. When the magnetic disk unit is driven and the magnetic disk starts to rotate, the magnetic head slider slightly floats to form a fine spacing (magnetic spacing) between the ABS and the surface of the magnetic disk. Stabilizing the floating amount makes it possible to perform accurate writing and reading of information.

Incidentally, in recent years, along with a progress in higher recording density (higher capacity) of the magnetic disk, reduction in recording track width is progressing. Such reduction in recording track width results in reduction in the size of the thin film magnetic head. Thus, signal recording performance of the magnetic write element on the magnetic disk is weakened and intensity of signal magnetic field from the magnetic disk is weakened as well. To compensate deterioration of these functions, it may be necessary to reduce the size of the magnetic spacing (bring the ABS of the thin film magnetic head closer to the surface of the magnetic disk).

Thus, when the floating height of the entire magnetic head slider is reduced, sufficient control is not performed, which causes the thin film magnetic head to contact a fine projection or any other thing on the surface of the magnetic disk. This may disadvantageously cause occurrence of an abnormal signal due to heat generation and abrasion of the thin film magnetic head itself.

To solve such an issue, the applicant has proposed a thin film magnetic head in which a heating means is provided on an opposite side of a magnetic conversion element from the ABS (refer to Japanese Unexamined Patent Application Publication No. 2003-168274). The magnetic conversion element is configured of a magnetic write element and a magnetic read element. In the thin film magnetic head, in driving of a magnetic disk unit, thermal expansion of surrounding parts of a heating element that is caused by heat generated by the heating element is used to cause the magnetic conversion element to protrude toward the ABS side, thereby achieving minute magnetic spacing. At this time, the heat generation amount is controlled to adjust a degree of the protrusion with high accuracy, and even the minute magnetic spacing is stably maintained. Thus, probability that a surface of a magnetic disk is brought into contact with the thin film magnetic head is considerably reduced.

Further, after the disclosure of the above-described thin film magnetic head, a thin film magnetic head has been proposed in which a temperature detection section is mounted and an amount of a current supplied to a heating element is controlled based on detected temperature information (for example, refer to Japanese Unexamined Patent Application Publication No. 2003-272335). In the thin film magnetic head, a pair of heating elements are so provided as to sandwich a magnetic conversion element along a rotation direction of a magnetic disk, and the temperature detection section is provided between one of the heating elements and the magnetic conversion element. In addition, as relevant prior art, a magnetic disk unit has been disclosed in which a magnetic head slider including a heating element and an arm provided with a temperature sensor are provided (for example, refer to U.S. Pat. No. 5,991,113). Also, a magnetic head slider in which two heaters are provided in one layer close to a thin film magnetic head has been disclosed in Japanese Unexamined Patent Application Publication No. 2008-165950. Furthermore, a magnetic head slider including a heater disposed near a read element has been disclosed in Japanese Unexamined Patent Application Publication No. 2007-280502.

SUMMARY

In recent years, however, since increase in recording density (capacity) of the magnetic disk is progressing, it is expected that downsizing of the thin film magnetic head is strongly demanded in order to handle the higher recording density (higher capacity) in the future.

However, a space where the heating element can be mounted is decreased due to downsizing of the thin film magnetic head, and it gradually becomes difficult to secure sufficient line width of the heating element near the ABS in particular. As a result, current density is locally increased at a part of the heating element when a current is supplied to the heating element, which may deteriorate the structure of the heating element itself.

Accordingly, it is desirable to provide a thin film magnetic head that achieves high operation reliability while controlling a degree of protrusion of the ABS with high accuracy.

A thin film magnetic head according to an embodiment of the invention includes: a magnetic pole including an end surface exposed on an air bearing surface; and a heating element including a first branch and a second branch and configured to heat a vicinity of the magnetic pole. The first branch and the second branch each expand along a stacking surface and are coupled in parallel to each other. The stacking surface intersects the air bearing surface.

A head gimbals assembly, a head arm assembly, and a magnetic disk unit according to respective embodiments of the invention each include the above-described thin film magnetic head.

In the thin film magnetic head, the head gimbals assembly, the head arm assembly, and the magnetic disk unit according to the respective embodiments of the invention, the heating element configured to heat the vicinity of the magnetic pole includes the first branch and the second branch that each expand along the stacking surface and are coupled in parallel to each other. Thus, when a current is supplied to the heating element, the current is branched to both the first branch and the second branch. Accordingly, even when the cross-sectional area of the first branch is small, increase of the current density in the first branch is moderated. In other words, it is possible to increase the current supplied to the entire heating element to enhance heat generation amount of the entire heating element while avoiding overheat of the first branch. In addition, since the first branch and the second branch each expand along the stacking surface that intersects the air bearing surface, expansion and contraction of the thin film magnetic head in a direction along the stacking surface are easily controlled. Therefore, for example, it is possible to extend the life of the heating element while disposing the first branch in a small region near the air bearing surface to efficiently cause the air bearing surface to protrude. Accordingly, it is advantageous to handling of high density recording.

BRIEF DESCRIPTION OF DRAWINGS

FIG. 8 is a plan view illustrating a heating element of a thin film magnetic head according to a second modification.

DETAILED DESCRIPTION

Figure 1:
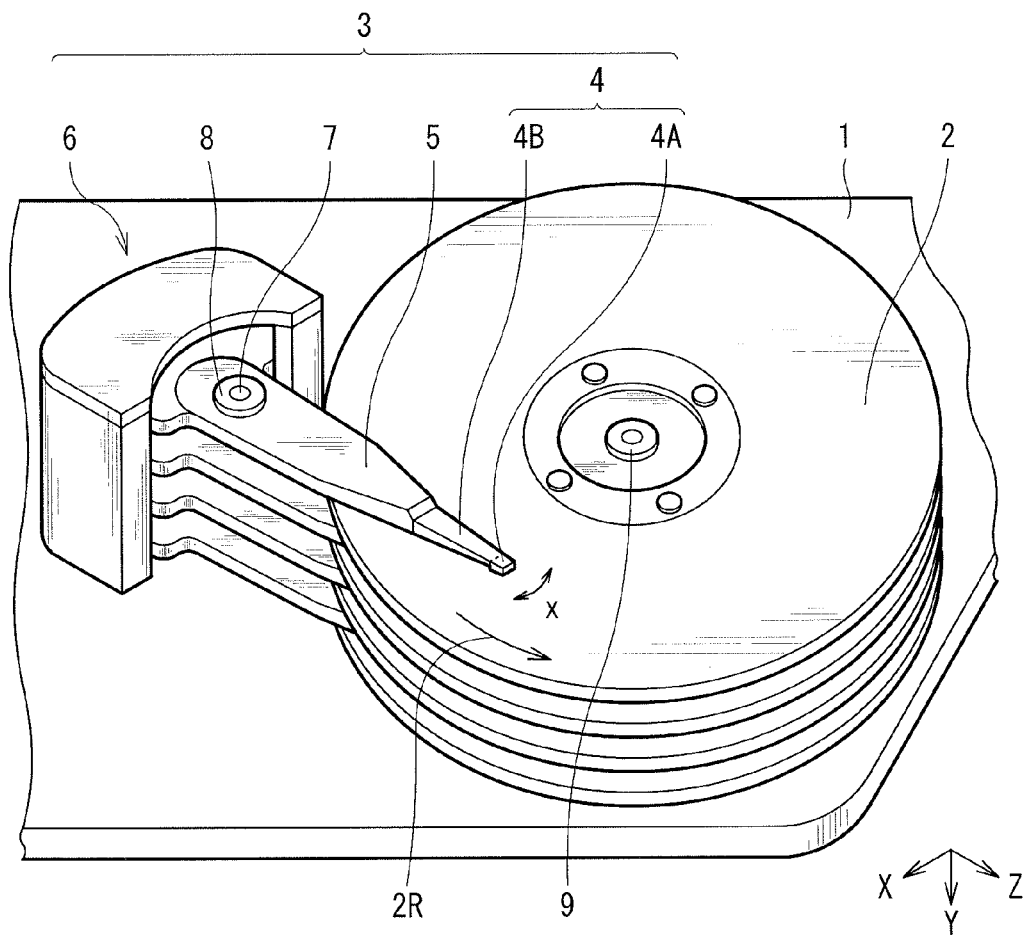
FIG. 1 is a perspective view illustrating a configuration of a magnetic disk unit including a thin film magnetic head according to an embodiment of the invention.

Some embodiments of the invention are described in detail below with reference to drawings.
<Configuration of Magnetic Disk Unit>
First, referring to FIG. 1 and FIG. 2, a configuration of a magnetic disk unit according to an embodiment of the invention is described below. FIG. 1 is a perspective view illustrating an internal configuration of the magnetic disk unit according to the present embodiment. The magnetic disk unit adopts a contact-start-stop (CSS) operation system as a driving system, and may include, for example, in a housing 1, a magnetic disk 2 as a magnetic recording medium in which information is to be written, and a head arm assembly (HAA) 3 for recording information in the magnetic disk 2 and reproducing the information. The HAA 3 includes a head gimbals assembly (HGA) 4, an arm 5 supporting a base of the HGA 4, and a driver 6 as a power source to allow the arm 5 to pivot. The HGA 4 includes a magnetic bead slider (hereinafter, simply referred to as a "slider") 4A having a side surface provided with a thin film magnetic head 10 (described later) according to the present embodiment, and a suspension 4B having an end provided with the slider 4A. The arm 5 supports the other end of the suspension 4B (an end opposite to the end provided with the slider 4A). The arm 5 is so configured as to be pivotable around a fixed shaft 7 with a bearing 8 in between. The fixed shaft 7 is fixed to the housing 1. The driver 6 may be configured of, for example but not limited to, a voice coil motor. Note that the magnetic disk unit has a plurality of (four in FIG. 1) magnetic disks 2, and the sliders 4A are disposed corresponding to recording surfaces (a front surface and a back surface) 2S of the respective magnetic disks 2. Each of the sliders 4A is movable in a direction across recording tracks (in an X-axis direction) in a plane parallel to the recording surfaces 2S of each of the magnetic disks 2. In contrast, the magnetic disk 2 rotates around a spindle motor 9 fixed to the housing 1 in a rotation direction 2R substantially orthogonal to the X-axis direction. The rotation of the magnetic disk 2 and the movement of the slider 4A cause information to be written into the magnetic disk 2 or cause written information to be read out.

Figure 2:
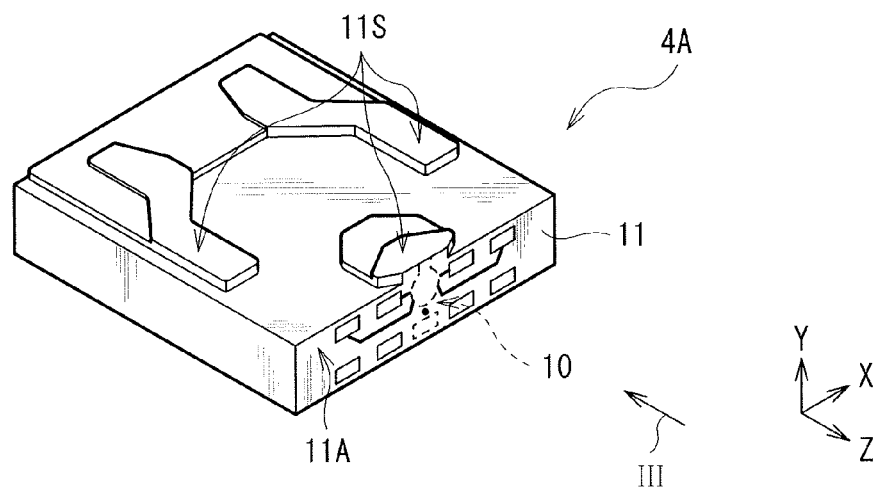
FIG. 2 is a perspective view illustrating a configuration of a slider in the magnetic disk unit illustrated in FIG. 1.

FIG. 2 illustrates a configuration of the slider 4A illustrated in FIG. 1. The slider 4A has a block-shaped base 11 that may be formed of, for example, AlTiC ($Al_2O_3.TiC$). The base 11 may be substantially formed as a hexahedron, for example, and one surface thereof corresponds to an ABS 11S that faces the recording surface 2S of the magnetic disk 2 and is disposed in proximity thereto. When the magnetic disk unit is not driven, namely, when the spindle motor 9 is stopped and the magnetic disk 2 does not rotate, the ABS 11S and the recording surface 2S are in contact with each other. When the magnetic disk 2 is caused to start rotating at a high speed by the spindle motor 9, air flow occurs between the recording surface 2S and the ABS 11S, and the slider 4A floats, by lift force caused by the air flow, along a direction orthogonal to the recording surface 2S (in an Y-axis direction), thereby forming a certain spacing (magnetic spacing) between the ABS 11S and the magnetic disk 2. In addition, the thin film magnetic head 10 is provided on an element forming surface 11A that is one side surface orthogonal to the ABS 11S.

<Detailed Configuration of Thin Film Magnetic Head 10>
Next, the thin film magnetic head 10 is described in more detail with reference to FIG. 3 and FIG. 4.

Figure 3:
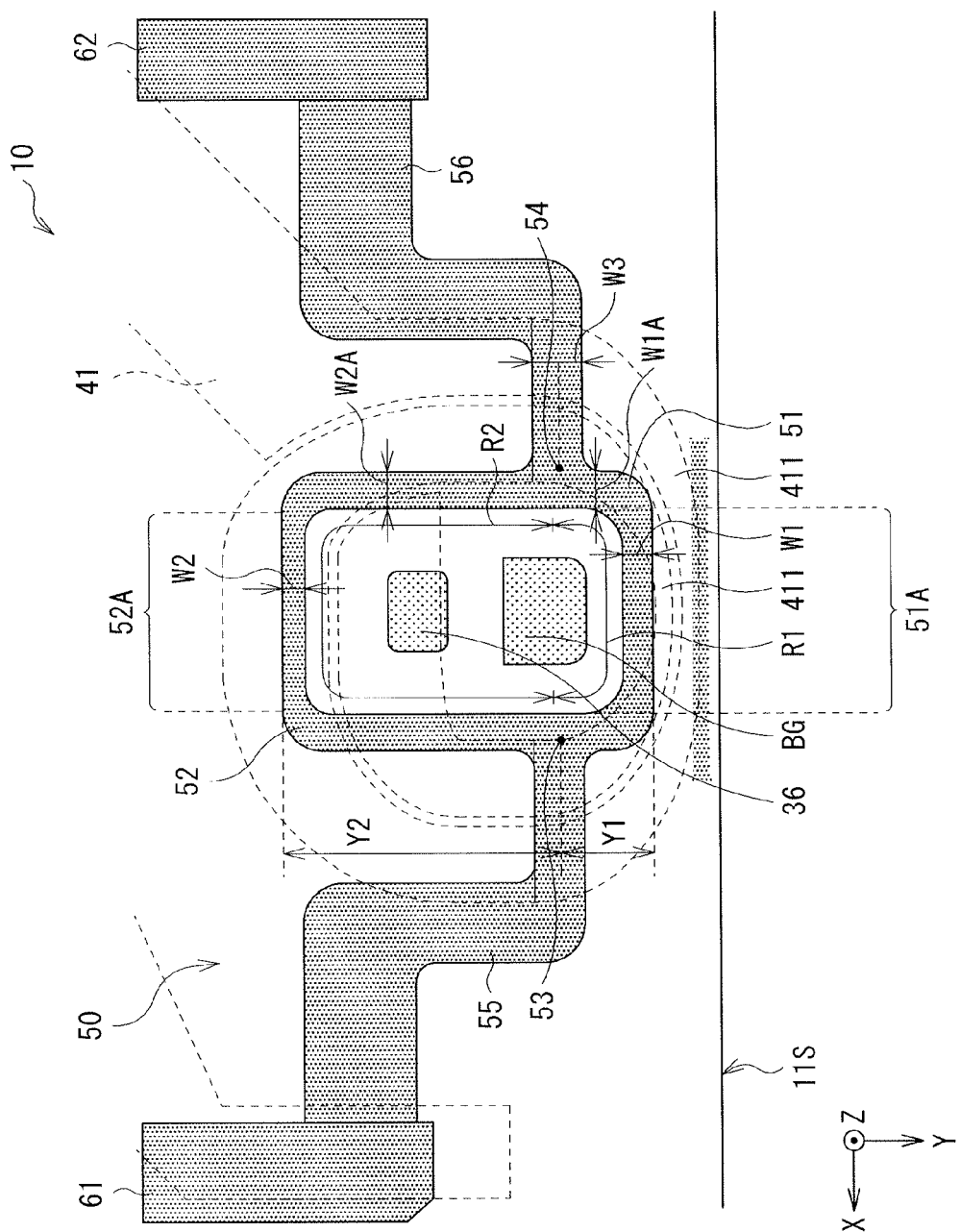
FIG. 3 is a plan view illustrating a configuration of a main part of the thin film magnetic head illustrated in FIG. 2 as viewed from an arrow III direction.

FIG. 3 is a plan view of the thin film magnetic head 10 as viewed from a direction of an arrow III illustrated in FIG. 2. FIG. 4 is a sectional diagram of the thin film magnetic head 10 at a center position thereof in a track width direction. Note that an up-arrow M illustrated in FIG. 4 indicates a direction in which the magnetic disk 2 moves relative to the thin film magnetic head 10.

In the following description, dimensions in the X-axis direction, the Y-axis direction, and the Z-axis direction are referred to as "width", "height", and "thickness", respectively, and closer side to the air bearing surface 11S and farther side therefrom in the Y-axis direction are referred to as "forward (or, in front of)" and "backward (or, behind)", respectively. Moreover, front side and back side in the direction of the arrow M are referred to as "trailing side" and "leading side", respectively. The X-axis direction and the Z-axis direction are referred to as "cross track direction" and "down track direction", respectively.

The thin film magnetic head 10 is to perform magnetic processing on the magnetic disk 2, and for example, may be a composite head that is allowed to perform both read processing and write processing.

Figure 4:
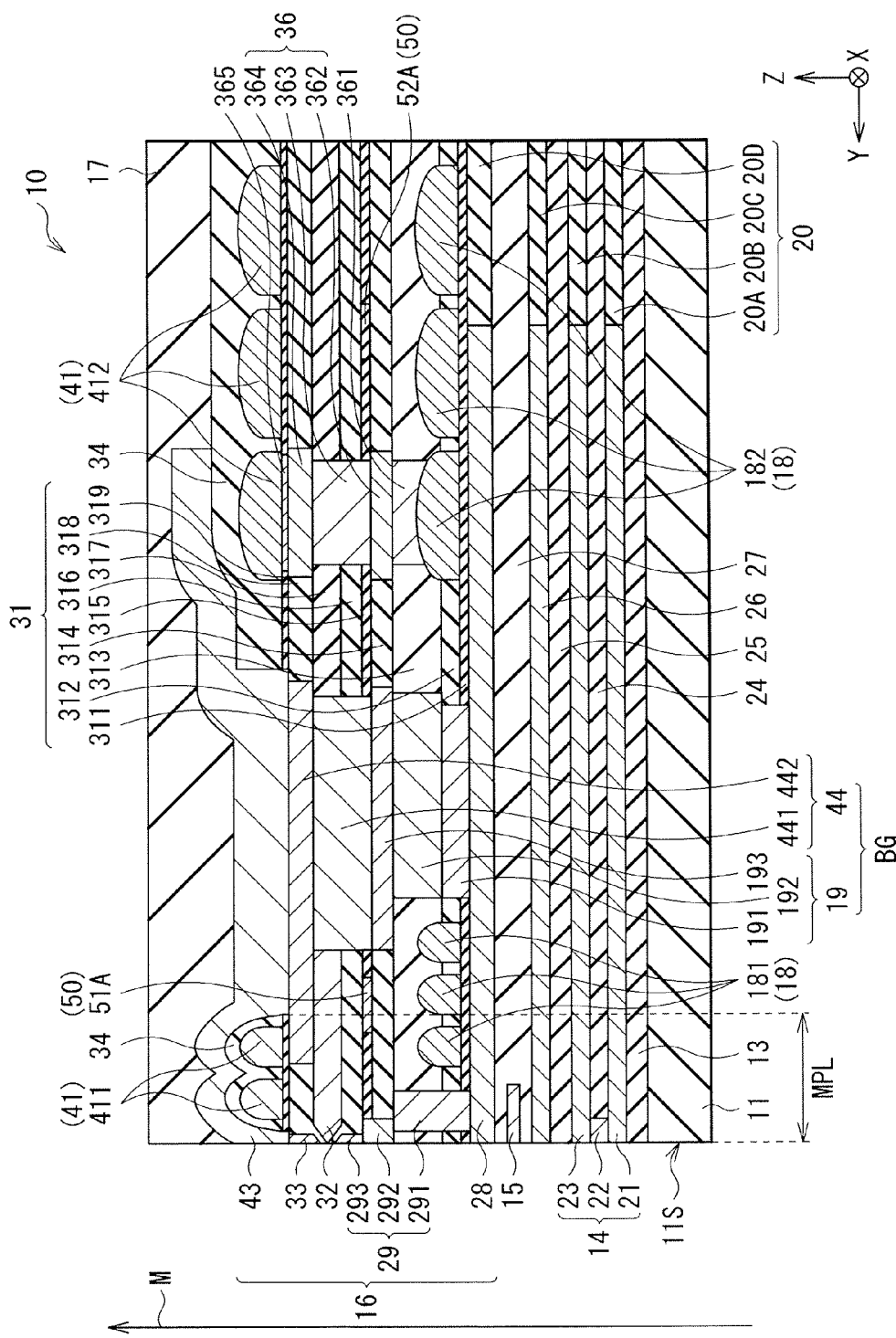
FIG. 4 is a sectional diagram illustrating a structure of the thin film magnetic head illustrated in FIG. 3.

For example, as illustrated in FIG. 4, the thin film magnetic head 10 may include an insulating layer 13, a read head section 14, a write head section 16, and a capping layer 17 that are stacked in order on the base 11. The thin film magnetic head 10 has the ABS 11S as one side surface common to these layers. An insulating layer 25, an intermediate shield layer 26, and an insulating layer 27 that are stacked in order on the read head section 14 are provided between the read head section 14 and the write head section 16.

The insulating layer 13 and the capping layer 17 may be formed of, for example, a non-magnetic insulating material such as aluminum oxide. Examples of aluminum oxide may include alumina ($Al_2O_3$).

(Read Head Section 14)

The read head section 14 uses magneto-resistive effect (MR) to perform read processing. The read head section 14 may include, for example, a lower shield layer 21, an MR element 22, and an upper shield layer 23 that are stacked in order on the insulating layer 13.

The lower shield layer 21 and the upper shield layer 23 may be each formed of, for example, a soft magnetic metal material such as an nickel-iron alloy (NiFe), and are disposed to face each other with the MR element 22 in between in the stacking direction (in the Z-axis direction). The lower shield layer 21 and the upper shield layer 23 each have an end surface exposed on the ABS 11S, and extend backward from the ABS 11S. Such a configuration allows the lower shield layer 21 and the upper shield layer 23 to serve to magnetically isolate the MR element 22 from its surroundings and protect the MR element 22 from influence of unnecessary magnetic field.

One end surface of the MR element 22 is exposed on the ABS 11S, and the other end surfaces thereof are in contact with an insulating layer 24 filling a space between the lower shield layer 21 and the upper shield layer 23. The insulating layer 24 may be formed of an insulating material such as aluminum oxide ($Al_2O_3$), aluminum nitride (AlN), silicon dioxide ($SiO_2$), and diamond-like carbon (DLC).

The MR element 22 serves as a sensor to read out magnetic information written in the magnetic disk 2. The MR element 22 may be, for example, a current perpendicular to plane (CPP)—giant magnetoresistive (GMR) element, sense current of which flows inside thereof in a stacking direction. Here, the lower shield layer 21 and the upper shield layer 23 each serve as an electrode to supply the sense current to the MR element 22.

In the read head section 14 having such a configuration, a magnetization direction of a free layer (not illustrated) included in the MR element 22 changes in response to a signal magnetic field from the magnetic disk 2. Thus, the magnetization direction of the free layer shows a change relative to a magnetization direction of a pinned layer (not illustrated) also included in the MR element 22. When the sense current flows through the MR element 22, the relative change in the magnetization direction appears as a change in the electric resistance. Thus, the signal magnetic field is detected with use of the change and the magnetic information is accordingly read out.

As mentioned above, the insulating layer 25, the intermediate shield layer 26, and the insulating layer 27 are stacked in order on the read head section 14. A resistance sensor 15 that is partially exposed on the ABS 11S is embedded in the insulating layer 27. A lower yoke 28 configuring a part of the write head section 16 is provided on the insulating layer 27. A part behind the lower shield layer 21 is occupied by an insulating layer 20A, a part behind the upper shield layer 23 is occupied by an insulating layer 20B, a part behind the intermediate shield layer 26 is occupied by an insulating layer 20C, and a part behind the lower yoke 28 is occupied by an insulating layer 20D. Note that, in the specification, the insulating layers 20A to 20D are collectively referred to as an insulating layer 20 in some cases. The intermediate shield layer 26 serves to prevent a magnetic field generated in the write head section 16 from reaching the MR element 22, and may be made of, for example, a soft magnetic metal material such as NiFe. The insulating layers 25 and 27 may be each made of the similar material to that of the insulating layer 24, for example.

(Write Head Section 16)

The write head section 16 is a so-called perpendicular magnetic write head performing write processing of perpendicular magnetic recording system. The write head section 16 may include, for example, the lower yoke 28, a lower coil 18, a leading shield 29, a heating element 50, a main magnetic pole 32, a pedestal yoke 33, an upper coil 41, and an upper yoke 43 that are stacked in order on the insulating layer 27. The lower coil 18 and the leading shield 29 are embedded in an insulating layer 31. The upper coil 41 is embedded in the insulating layer 34. A space between the lower coil 18 and the upper coil 41 behind the leading shield 29 is occupied by the insulating layer 31 (311 to 319). The heating element 50 is embedded in the insulating layer 31.

The write head section 16 further includes a back gap BG configured of a lower back gap 19 and an upper back gap 44. The lower back gap 19 is coupled to the lower yoke 28, and the upper back gap 44 is coupled to the upper yoke 43. Here, the lower back gap 19 is configured of magnetic layers 191 to 193 that are stacked in order on the lower yoke 28. In addition, the upper back gap 44 is configured of a magnetic layer 441 and a magnetic layer 442 that are stacked in order on the magnetic layer 193 of the lower back gap 19. A top surface of the magnetic layer 442 is in contact with a bottom surface of the upper yoke 43.

The upper coil 41 generates, in response to supply of a current, a recording-use magnetic flux inside a magnetic path that is configured mainly of the leading shield 29, the lower yoke 28, the lower back gap 19, the upper back gap 44, the upper yoke 43, and the magnetic pole 32. In contrast, the lower coil 18 generates a magnetic flux for suppressing leakage mainly in order to prevent the recording-use magnetic flux generated in the upper coil 41 from unintentionally reaching (being leaked to) the read head section 14. The current flows through the lower coil 18 in a direction opposite to a direction of the current flowing through the upper coil 41. The lower coil 18 and the upper coil 41 each may be formed of, for example, a highly-electroconductive material such as copper (Cu), and have a structure (a spiral structure) winding around a region occupied by the back gap BG (the lower back gap 19 and the upper back gap 44) in the stacked-layer plane (in the XY plane). The lower coil 18 is provided on the insulating layer 311 and is embedded in the insulating layer 312 and the insulating layer 313. The upper coil 41 is provided on the insulating layer 319 and is embedded in the insulating layer 34. Also, a part of a backward part 182 of the lower coil 18 and a part of a backward part 412 of the upper coil 41 are coupled to each other through a pillar 36 that extends in a thickness direction through the insulating layer 31. The lower coil 18 and the upper coil 41 are coupled in series to each other through the pillar 36. The pillar 36 has a stacked structure configured of electroconductive layers 361 to 365 that are stacked in order between the backward part 182 of the lower coil 18 and the backward part 412 of the upper coil 41. Note that, in FIG.

3, only the ABS 11S, the upper coil 41, the back gap BG, the pillar 36, and the heating element 50 are illustrated and other components such as the lower coil 18 are not illustrated in order not to deteriorate visibility.

A forward part 181 of the lower coil 18, namely, a part of the lower coil 18 located between the lower back gap 19 and the ABS 11S may preferably have a size in the Y direction smaller than the size, in the Y direction, of the backward part 182 of the lower coil 18 that is located behind the lower back gap 19 (FIG. 4). Likewise, the size, in the Y direction, of a forward part 411 of the upper coil 41 that is located between the upper back gap 44 and the ABS 11S may be preferably smaller than the size, in the Y direction, of the backward part 412 of the upper coil 41 that is located behind the upper back gap 44 (FIG. 4). This is because making the size of the forward part 181 and the forward part 411 smaller in the Y direction is advantageous to shortening in magnetic path length MPL (see FIG. 4).

The lower yoke 28, the leading shield 29, the lower back gap 19, the upper yoke 43, the upper back gap 44, and the pillar 36 are each formed of, for example, a soft magnetic metal material with high saturation flux density such as NiFe. The lower yoke 28 and the upper yoke 43 are magnetically coupled to each other through the back gap BG. The leading shield 29 is coupled to a forward part of the top surface of the lower yoke 28, and is so disposed as to be partially exposed on the ABS 11S. The leading shield 29 may have a structure in which, for example, a lower layer part 291, an intermediate part 292, and an upper layer part 293 are stacked in order along the ABS 11S. In the example of FIG. 4, the lower layer part 291 is provided at a position slightly recessed from the ABS 11S, and the intermediate part 292 and the upper layer part 293 are so provided as to be exposed on the ABS 11S. The insulating layers 311 to 316 are so stacked in order behind the leading shield 29 as to cover the lower yoke 28 and to cause the lower coil 18 to be embedded therein.

The leading shield 29 serves as a return path on the leading side, and disperses a part of a write magnetic field emitted from the magnetic pole 32 to the leading side, thereby reducing a wide adjacent track erase (WATE) effective magnetic field. The WATE effective magnetic field refers to an effective magnetic field that influences adjacent tracks in a wide region (for example, tracks in two to ten lanes next to a track to be written).

The magnetic pole 32 contains the magnetic flux generated in the lower coil 18 and the upper coil 41, and emits the magnetic flux from the ABS 11S, thereby generating a write magnetic field. The main magnetic pole 32 extends backward from the ABS 11S, and may be formed of, for example, a magnetic material with high saturation flux density such as an iron-based alloy. Examples of the iron-based alloy may include an iron-cobalt alloy (FeCo) and an iron-cobalt-nickel alloy (FeCoNi).

In the write head section 16 having such a configuration, a magnetic flux is generated, by the current (the write current) flowing through the upper coil 41, inside the magnetic path configured mainly of the leading shield 29, the lower yoke 28, the lower back gap 19, the upper back gap 44, the upper yoke 43, and the magnetic pole 32. As a result, the write magnetic field (the signal magnetic field) is generated near the end surface of the magnetic pole 32 exposed on the ABS 11S, and the write magnetic field reaches a predetermined region of the recording surface of the magnetic disk 2.

(Detailed Configuration of Heating Element 50)

As illustrated in FIG. 3, the heating element 50 includes a first branch 51 and a second branch 52 that are coupled in parallel to each other. The heating element 50 generates heat by itself to cause the vicinity thereof to thermally expand, thereby causing the ABS 11S of the thin film magnetic head 10 to protrude to bring the ABS 11S closer to the surface of the magnetic disk 2. Both ends of the heating element 50 are coupled to respective paired leads 61 and 62. For example, the heating element 50 may form a linear pattern expanding along the stacking surface on the insulating layer 314 and may be made of an electroconductive material containing one or more of a nickel-chromium alloy (NiCr), a nickel-copper alloy (NiCu), copper (Cu), gold (Au), nickel (Ni), cobalt (Co), tantalum (Ta), tungsten (W), molybdenum (Mo), and rhodium (Rh). The leads 61 and 62 are coupled to respective electrodes (not illustrated) provided in the element forming surface 11A. Note that the constituent material of the first branch 51 may be different from the constituent material of the second branch 52 to adjust respective resistance values. Also, the heating element 50 may be desirably provided in the same layer as a whole and have a substantially fixed thickness in order not to cause unnecessary steps and to secure flatness of the thin film magnetic head 10. However, for example, the thickness of the first branch 51 may be made different from the thickness of the second branch 52 to adjust the respective resistance values. The heating element 50 is supplied with a current through the leads 61 and 62, thereby generating heat based on the resistance of the heating element St) itself.

The heating element 50 further includes a first coupling part 53 and a second coupling part 54. The first coupling part 53 couples one end of the first branch 51 to one end of the second branch 52. The second coupling part 54 couples the other end of the first branch 51 to the other end of the second branch 52. The first coupling part 53 and the lead 61 are coupled to each other through a joint part 55, and the second coupling part 54 and the lead 62 are coupled to each other through a joint part 56.

The first branch 51 includes a first extending part 51A that extends in the track width direction (in the X-axis direction) parallel to both the ABS 11S and the stacking surface. The second branch 52 includes a second extending part 52A that extends in the track width direction. The first extending pan 51A and the second extending part 52A are adjacent to each other with a distance in between in a height direction (in the Y-axis direction) orthogonal to the ABS 11S. Here, the first ex tending part 51A is located in front of the second extending part 52A. In other words, the first extending part 51A is provided between the ABS 11S and the second extending part 52A.

The first extending part 51A may have a first width W1 in the height direction, and the second extending part 52A may have a second width W2 that is different from the first height W1, in the height direction. Note that FIG. 3 exemplifies a case where the first width W1 is larger than the second width W2. Also, a length of a first path R1 from the first coupling part 53 to the second coupling part 54 of the first branch 51 may be preferably different from a length of a second path R2 from the first coupling part 53 to the second coupling part 54 of the second branch 52. This is because a resistance of the first path R1 and a resistance of the second path R2 are easily adjusted thereby. Note that FIG. 3 exemplifies a case where the length of the first path R1 is smaller than the length of the second path R2.

Further, in the height direction, a distance Y2 from the first coupling part 53 (or the second coupling part 54) to a backward edge of the second extending part 52A may be desirably larger than a half of a distance Y1 from the first coupling part 53 (or the second coupling part 54) to a forward edge of the first extending part 51A (Y2>0.5×Y1). In particular, the distance Y2 may be preferably double or more of the distance Y1. When the resistance value of the first path R1 is made larger than the resistance value of the second path R2, a larger amount of current is introduced to the first path R1. As a result, it is possible to enhance a heat generation amount of the first extending part 51A and to cause the heating element 50 to efficiently cause the ABS 11S to protrude.

Further, a minimum width (hereinafter, referred to as a third width W3) of each of the joint parts 55 and 56 in the height direction may be desirably larger than the first width W1 (W3>W1 may be desirably satisfied). In addition, the third width W3 may be desirably larger than one or both of the second width W2 and a minimum width (hereinafter, referred to as a width W2A) of the second branch 52 in the track width direction (in the X-axis direction) (one or both of W3>W2 and W3>W2A may be desirably satisfied). This is because reliability of parts, each having the third width W3, of the respective joint parts 55 and 56 is enhanced. Further, a minimum width (hereinafter, referred to as a width W1A) of the first branch 51 in the track width direction (in the X-axis direction) may be preferably equal to or larger than the first width W1 (W1A≥W1). This is because reliability of a part, having the width W1A, of the first branch 51 is enhanced. Furthermore, the first width W may be desirably larger than the second width W2 or the width W2A (W>W2 or W1>W2A may be desirably satisfied). This is because efficiency of the heating element 50 causing the ABS 11S to protrude is further improved.

In the present embodiment, the first extending part 51A is located between the ABS 11S and the back gap BG. Also, the second extending part 52A is located behind the pillar 36. In other words, the back gap BG and the pillar 36 are provided between the first extending part 51A and the second extending part 52A.

The resistance sensor 15 detects heat generation caused by the contact between the thin film magnetic head 10 and the magnetic disk 2, based on variation (increase) in its own electric resistance value. The resistance sensor 15 may have an end surface exposed on the ABS 11S, but may be provided at a position recessed backward from the ABS 11S by a distance of about 10 nm to about 200 nm. Examples of the constituent material of the resistance sensor 15 may include, in addition to NiFe, nickel (Ni), titanium (Ti), tungsten (W), platinum (Pt), tantalum (Ta), ruthenium (Ru), gold (Au), and an alloy containing one or more of these elements. Further, the resistance sensor 15 may have a multilayer structure formed of same material or different materials, without limitation to a single-layer structure.

<Operation, Action, and Effects of Magnetic Disk Unit>

Figure 5:
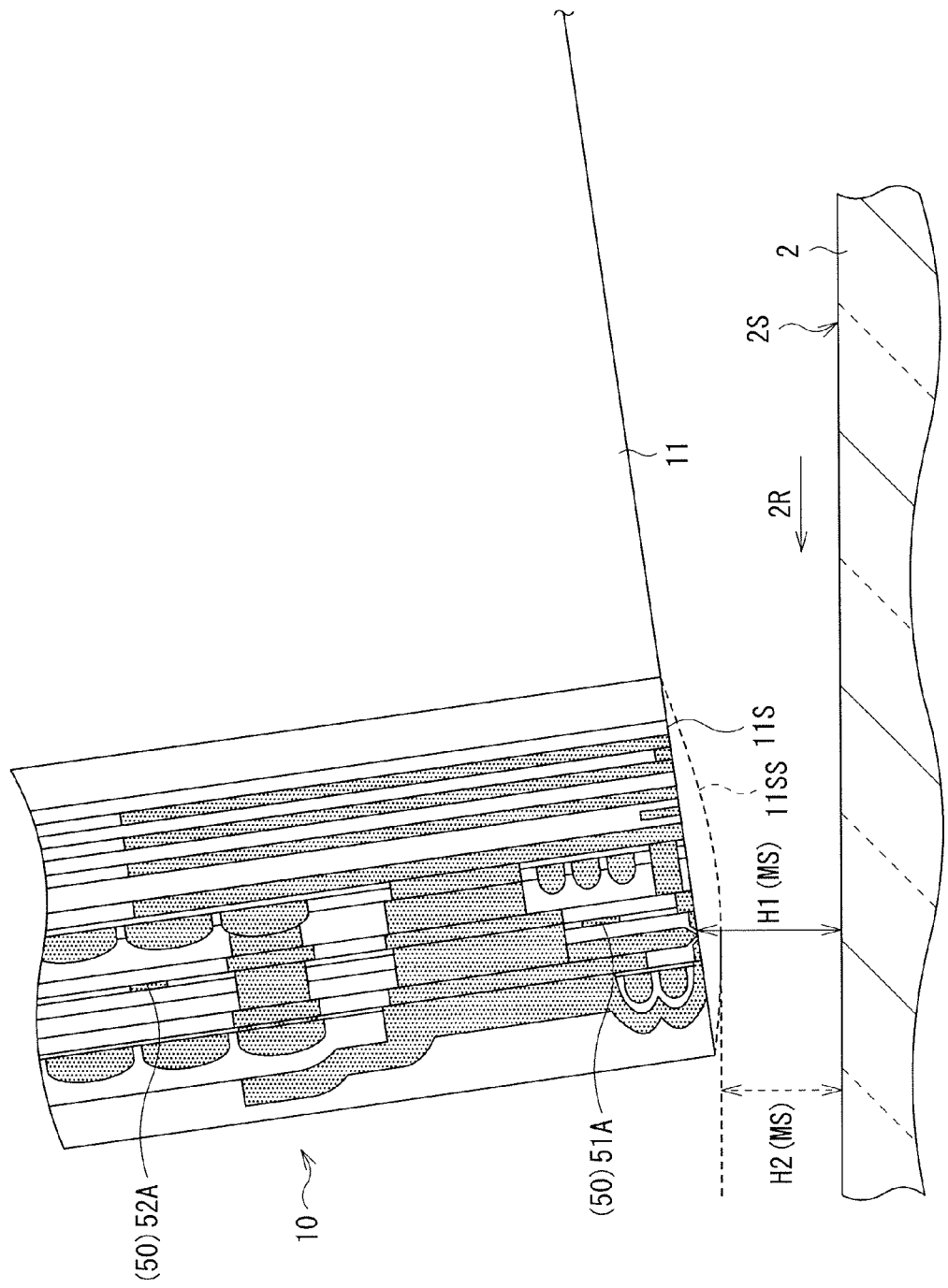
FIG. 5 is an explanatory diagram illustrating a state of a magnetic disk and the thin film magnetic head of the magnetic disk unit illustrated in FIG. 1 when being driven.

Subsequently, operation and action of the magnetic disk unit including the thin film magnetic head 10 that is configured as above are described with reference to FIG. 5 in addition to FIG. 1 to FIG. 4. FIG. 5 is a sectional diagram illustrating positional relationship between the magnetic disk 2 and the thin film magnetic head 10 in writing or in reading.

In the magnetic disk unit, when writing (recording) and reading (reproducing) of magnetic information are performed, the magnetic disk 2 is rotated at a high speed in the rotation direction 2R (FIG. 1 and FIG. 5) by the spindle motor 9. The slider 4A accordingly floats from the recording surface 2S (FIG. 5). At this time, the slider 4A leans forward such that the write head section 16 of the thin film magnetic head 10 comes closer to the recording surface 2S than to the read head section 14. A magnetic spacing MS becomes H1 immediately after the rotation of the magnetic disk 2 is stabilized.

Here, when the current is supplied to the heating element 50 to cause the heating element 50 to generate heat, surrounding parts thereof, in particular, the insulating layer 31 is thermally expanded. Thus, the write head section 16 is pushed out forward, and the ABS 11S protrudes up to a position of the ABS 11SS illustrated by a dashed line. As a result, the distance between the write head section 16 and the recording surface 2A, namely, the magnetic spacing MS is decreased to H2, which allows writing into the recording track with a smaller width. At this time, adjusting the amount of the current to be supplied to the heating element 50 makes it possible to control a degree of the protrusion.

In the present embodiment, the heating element 50 includes the first branch 51 and the second branch 52 that each expand along the stacking surface and are coupled in parallel to each other. Thus, the current is branched to both the first branch 51 and the second branch 52 when the current is supplied to the heating element 50 through the leads 61 and 62. Accordingly, for example, even when the cross-sectional area of the first branch 51 is small, increase of current density in the first branch 51 is moderated. In other words, it is possible to increase the current supplied to the entire heating element 50 to enhance a heat generation amount of the entire heating element 50 while suppressing overheat of the first branch 51 to avoid deterioration of the heating element 50. In addition, since the first branch 51 and the second branch 52 each expand along the stacking surface (the XY plane) intersecting the ABS 11S, it becomes easier to control expansion and contraction of the thin film magnetic head 10 in the direction along the stacking surface (in particular, in the Y-axis direction). Accordingly, for example, it is possible to dispose the first branch 51 in a small region near the ABS 11S to efficiently cause the ABS 11S to protrude, and to extend life of the heating element 51. Thus, according to the thin film magnetic head 10, the degree of the protrusion of the ABS 11S is sufficiently secured while handling reduction of the entire size, which is advantageous to handling of high density recording. Also, in the present embodiment, since the heating element 50 and the magnetic pole 32 are electrically isolated (insulated) from each other, the current flowing through the heating element 50 does not flow through the magnetic pole 32. Thus, supplying the current to the heating element 50 in order to cause the heating element 50 to generate heat may less directly influence the write magnetic field passing through the magnetic pole 32. In contrast, when the heating element 50 and the magnetic pole 32 are not electrically isolated (insulated) from each other, the current supplied to the heating element 50 is leaked to the magnetic pole 32, which may cause an unnecessary magnetic field in the magnetic pole 32.

<Modifications>

As mentioned above, although the invention has been described with reference to some embodiments, the invention is not limited to the above-described embodiments, and various modifications may be made. For example, although the perpendicular magnetic write head of the invention has been applied to a composite head, the application is not necessarily limited thereto, and the perpendicular magnetic write head of the invention may be applied to a write only head not including a read head section.

Also, in the present embodiment, although the CPP-GMR element has been described as an example of the read element, the read element is not limited thereto. Alternatively, the read element may be of current in the plane (CIP) type. Alternatively, a tunneling magnetoresistance (TMR) element including a tunnel junction film may be used.

(First Modification)

Figure 6:
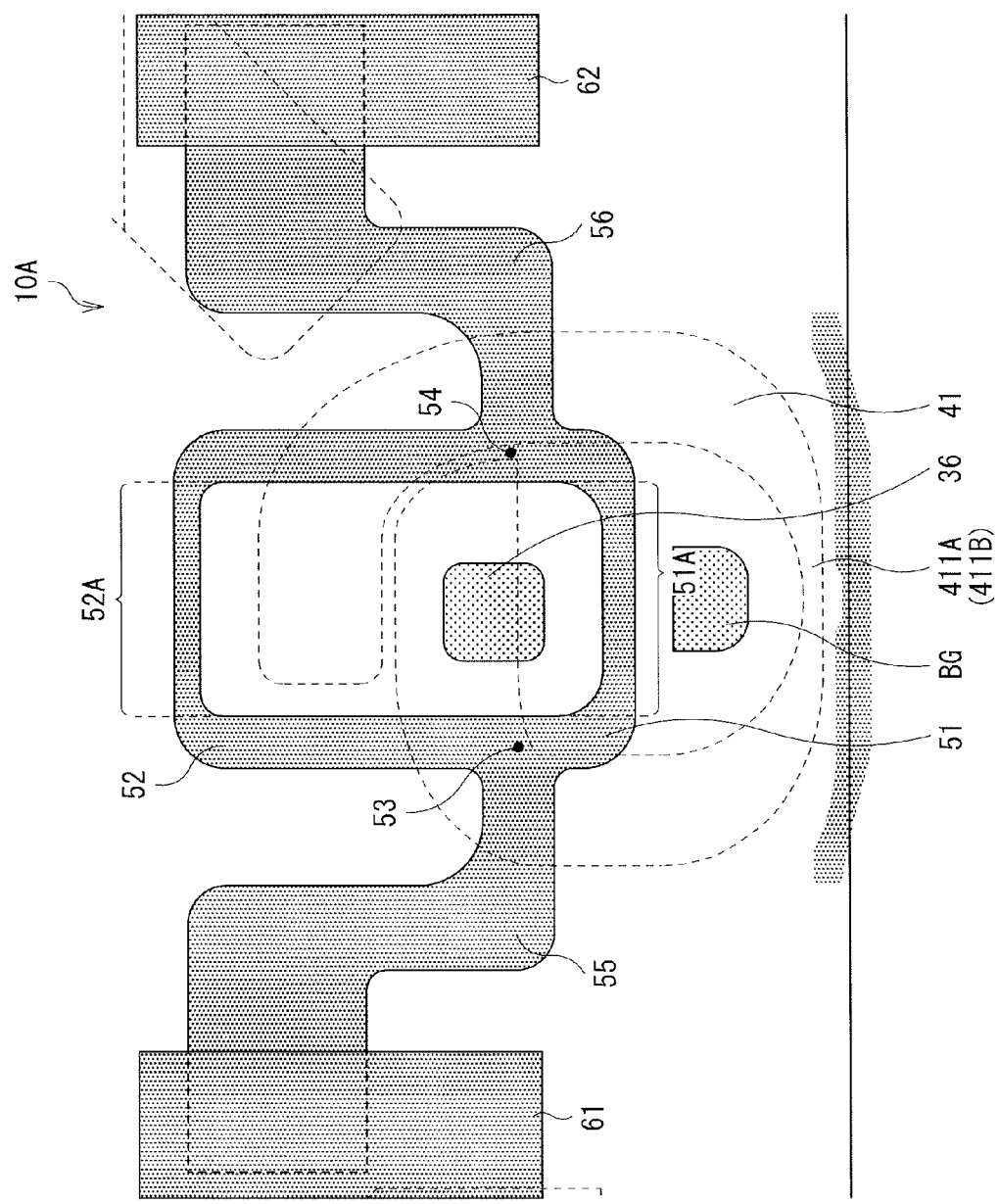
FIG. 6 is a plan view illustrating a configuration of a main part of a thin film magnetic head according to a first modification.
Figure 7:
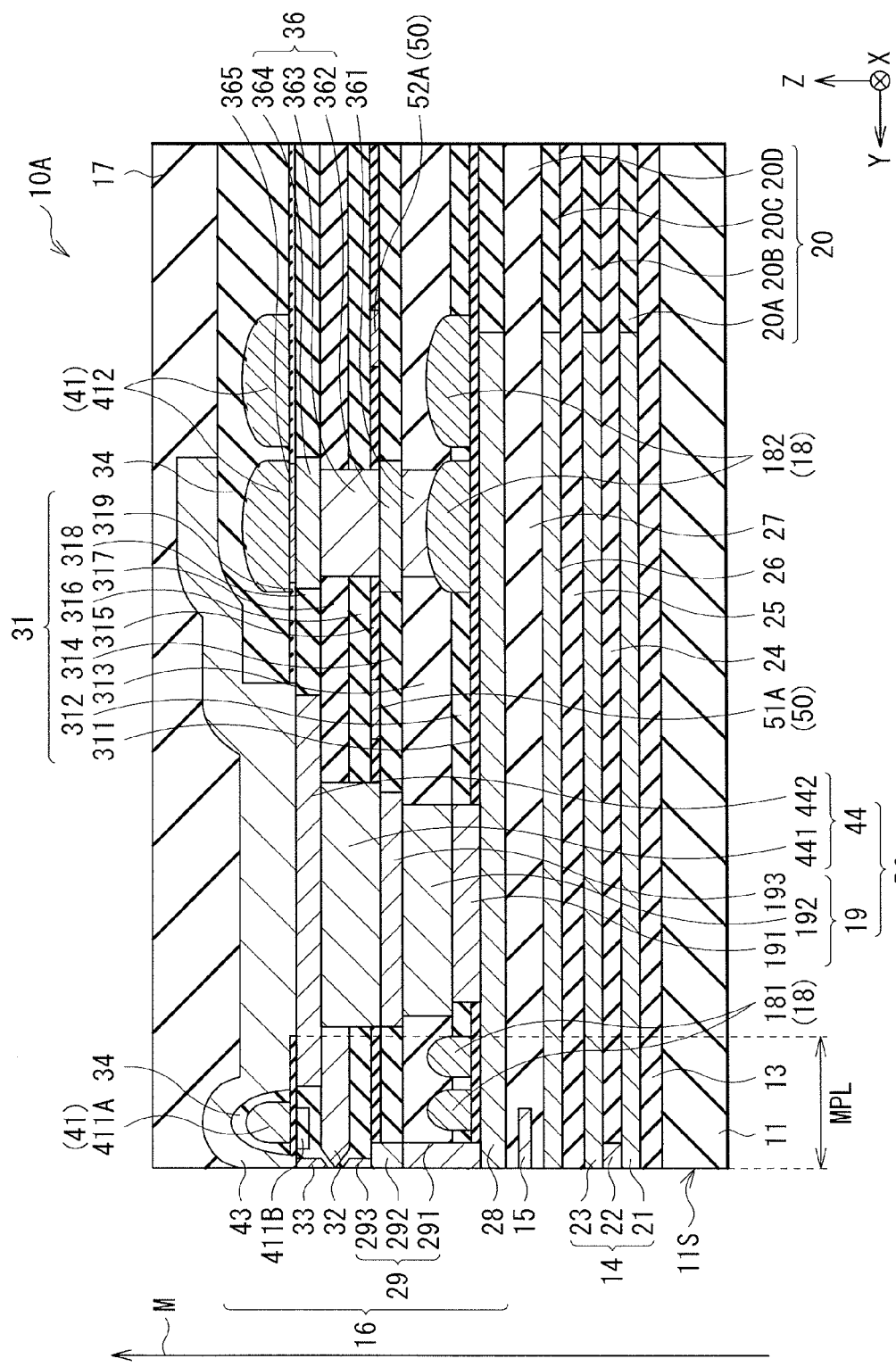
FIG. 7 is a sectional diagram illustrating the configuration of the main part of the thin film magnetic head according to the first modification.

Further, various modifications may be made on the configuration (the shape) of the main part of the thin film magnetic head. Hereinafter, a modification of the thin film magnetic head according to the above-described embodiment is described. FIG. 6 is a plan view illustrating a configuration of a main part of a thin film magnetic head 10A according to a first modification of the above-descried embodiment, and FIG. 7 is a sectional diagram illustrating the entire configuration thereof. FIG. 6 and FIG. 7 respectively correspond to FIG. 3 and FIG. 4 of the above-described embodiment (the thin film magnetic head 10).

The upper coil 41 is provided in one layer in the above-described embodiment. In the present modification, the forward part 411 of the upper coil 41 includes a forward coil part 411A and a forward coil part 411B. The forward coil part 411A is provided on the insulating layer 319, and the forward coil part 411B is located below the forward coil part 411A and is embedded in the insulating layer 318. In this way, the thin film magnetic head 10A includes the forward coil part 41A and the forward coil part 411B that are provided in layers different from each other. This makes it possible to shorten the magnetic path length MP while maintaining the entire number of coil turns, as compared with the thin film magnetic head 10 according to the above-described embodiment.

In the thin film magnetic head 10A, however, to handle shortening of the magnetic path length MPL, the back gap BG is provided at a position closer to the ABS 11S. Thus, the first extending part 51A is located behind the back gap BG, and may be provided, for example, between the back gap BG and the pillar 36. Also, the second extending part 52A is located behind the pillar 36. In other words, the pillar 36 is located between the first extending part 51A and the second extending part 52A.

Also in the present modification, the heating element 50 includes the first branch 51 and the second branch 52 that each expand along the stacking surface and are coupled in parallel to each other. Thus, effects similar to those of the above-described embodiment can be expected. In other words, according to the thin film magnetic head 10A, it is possible to extend the life of the heating element 50 while efficiently causing the ABS 11S to protrude. As a result, the degree of the protrusion of the ABS 11S is sufficiently secured while handling reduction of the entire size, which is advantageous to handling of high density recording.

(Second Modification)

Also, the planar shape of the heating element may be variously modified. FIG. 8 is a plan view illustrating a heating element 50A according to a second modification of the above-described embodiment, and corresponds to FIG. 3 of the above-described embodiment (the thin film magnetic head 10).

In the above-described embodiment, the length of the first extending part 51A of the first branch 51 in the X-axis direction is equal to the length of the second extending part 52A of the second branch 52 in the X-axis direction. In contrast, in the present modification, a length X1 of the first extending part 51A in the X-axis direction is different from a length X2 of the second extending part 52A in the X-axis direction (X1≠X2). As illustrated in FIG. 8, a length 36X of the pillar 36 in the X-axis direction is substantially equal to the length X1 of the first extending part 51A. In this case, the length X1 may be preferably smaller than the length X2 (X1<X2) because the efficiency in causing the ABS 11S to protrude is further improved as compared with a case where the length X1 is larger than the length X2 (X1>X2). In contrast, when the length 36X of the pillar 36 is smaller than the length X1 of the first extending part 51A, the length X1 may be preferably made larger than the length X2 (X1>X2). This is because the efficiency in causing the ABS 11S to protrude is further improved as compared with a case where the length X1 is smaller than the length X2 (X1<X2).

The correspondence relationships between the reference numerals and the components of the present embodiment are collectively illustrated as follows.

1 . . . housing, 2 . . . magnetic disk, 3 . . . head arm assembly (HAA), 4 . . . head gimbals assembly (HGA), 4A . . . slider, 4B . . . suspension, 5 . . . arm, 6 . . . driver, 7 . . . fixed shaft, 8 . . . bearing, 9 . . . spindle motor, 10 . . . thin film magnetic head, 11 . . . base, 11A . . . element forming surface, 11S . . . air bearing surface (ABS), 12 . . . insulating layer, 13 . . . insulating layer, 14 . . . read head section, 15 . . . resistance sensor, 16 . . . write head section, 17 . . . capping layer, 18 . . . lower coil, 181 . . . forward part, 182 . . . backward part, 19 . . . lower back gap, 20 (20A to 20D) . . . insulating layer, 21 . . . lower shield layer, 22 . . . MR element, 23 . . . upper shield layer, 24, 25, 27 . . . insulating layer, 26 . . . intermediate shield layer, 28 . . . lower yoke, 29 . . . leading shield, 31 . . . insulating layer. 32 . . . main magnetic pole, 33 . . . pedestal yoke, 34 . . . insulating layer, 36 . . . pillar, 41 . . . upper coil, 411 . . . forward part, 412 . . . backward part, 43 . . . upper yoke, 44 . . . upper back gap. BG . . . back gap, 50 . . . heating element, 51 . . . first branch, 52 . . . second branch, 61, 62 . . . electrode.

The invention claimed is:

1. A thin film magnetic head, comprising:
a magnetic pole including an end surface exposed on an air bearing surface; and
a heating element including a first branch and a second branch and configured to heat a vicinity of the magnetic pole, the first branch and the second branch each expanding along a stacking surface and being coupled in parallel to each other, and the stacking surface intersecting the air bearing surface, wherein
the first branch includes a first extending part extending in a track width direction that is parallel to both the air bearing surface and the stacking surface,
the second branch includes a second extending part extending in the track width direction,
the first extending part and the second extending part are adjacent to each other with a distance in between in a height direction orthogonal to the air bearing surface,
the first extending part has a first width in the height direction,
the second extending part has a second width in the height direction, the second width being different from the first width,
the heating element includes a first coupling part and a second coupling part, the first coupling part coupling one end of the first branch to one end of the second branch, and the second coupling part coupling the other end of the first branch to the other end of the second branch, and
a first length of a first path from the first coupling part to the second coupling part of the first branch is different from a second length of a second path from the first coupling part to the second coupling part of the second branch.

2. The thin film magnetic head according to claim 1, further comprising:
a shield provided on an opposite side of the heating element from the magnetic pole; and
a first pillar coupling the magnetic pole to the shield, wherein
the first extending part is located between the air bearing surface and the first pillar.

3. The thin film magnetic head according to claim 2, wherein the first pillar is located between the air bearing surface and the second extending part.

4. The thin film magnetic head according to claim 1, further comprising:
a shield provided on an opposite side of the heating element from the magnetic pole; and
a first pillar coupling the magnetic pole to the shield, wherein
the first pillar is located between the first extending part and the second extending part.

5. The thin film magnetic head according to claim 4, further comprising:
a first coil;
a second coil provided on an opposite side of the heating element from the first coil; and
a second pillar coupling the first coil to the second coil, wherein
the first extending part is located between the second pillar and the air bearing surface, and
the second pillar is located between the first extending part and the second extending part.

6. The thin film magnetic head according to claim 5, wherein the first coil and the second coil are both wound along the stacking surface.

7. The thin film magnetic head according to claim 1, wherein the first pillar is located between the air bearing surface and the second extending part.

8. The thin film magnetic head according to claim 1, wherein the first branch and the second branch each contain a conductive material that contains one or more of tungsten (W), a nickel-chromium alloy (NiCr), and a nickel-copper alloy (NiCu).

9. The thin film magnetic head according to claim 1, wherein the magnetic pole and the heating element are electrically isolated from each other.

10. A head gimbals assembly, comprising:
a magnetic head slider including the thin film magnetic head according to claim 1 provided on a side surface thereof; and
a suspension having an end to which the magnetic head slider is attached.

11. A head arm assembly, comprising:
a magnetic head slider including the thin film magnetic head according to claim 1 provided on a side surface thereof;
a suspension having one end to which the magnetic head slider is attached; and
an arm supporting the other end of the suspension.

12. A magnetic disk unit with a magnetic recording medium and a head arm assembly, the head arm assembly comprising:
a magnetic head slider including the thin film magnetic head according to claim 1 provided on a side surface thereof;
a suspension having one end to which the magnetic head slider is attached; and
an arm supporting the other end of the suspension.

13. A thin film magnetic head, comprising:
a magnetic pole including an end surface exposed on an air bearing surface;
a heating element including a first branch and a second branch and configured to heat a vicinity of the magnetic pole, the first branch and the second branch each expanding along a stacking surface and being coupled in parallel to each other, and the stacking surface intersecting the air bearing surface;
a shield provided on an opposite side of the heating element from the magnetic pole;
a first pillar coupling the magnetic pole to the shield,
a first coil;
a second coil provided on an opposite side of the heating element from the first coil;
a second pillar coupling the first coil to the second coil, wherein
the first extending part is located between the second pillar and the air bearing surface, and
the second pillar is located between the first extending part and the second extending part, wherein
the first extending part is located between the air bearing surface and the first pillar.

14. The thin film magnetic head according to claim 13, wherein the first coil and the second coil are both wound along the stacking surface.

15. A thin film magnetic head comprising:
a magnetic pole including an end surface exposed on an air bearing surface; and
a heating element including a first branch and a second branch and configured to heat a vicinity of the magnetic pole, the first branch and the second branch each expanding along a stacking surface and being coupled in parallel to each other, and the stacking surface intersecting the air bearing surface, wherein
the first branch is formed of a material different from a material of which the second branch is formed.

* * * * *